United States Patent

Akyildiz et al.

(10) Patent No.: US 10,540,300 B2
(45) Date of Patent: Jan. 21, 2020

(54) OPTIMIZING NETWORK DRIVER PERFORMANCE AND POWER CONSUMPTION IN MULTI-CORE PROCESSOR-BASED SYSTEMS

(71) Applicant: QUALCOMM Incorporated, San Diego, CA (US)

(72) Inventors: Orhan Kemal Akyildiz, San Diego, CA (US); Debashis Dutt, San Jose, CA (US); Sunit Bhatia, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 15/897,871

(22) Filed: Feb. 15, 2018

(65) Prior Publication Data

US 2018/0232321 A1 Aug. 16, 2018

Related U.S. Application Data

(60) Provisional application No. 62/459,856, filed on Feb. 16, 2017.

(51) Int. Cl.
*G06F 13/10* (2006.01)
*G06F 9/48* (2006.01)
(Continued)

(52) U.S. Cl.
CPC .............. *G06F 13/102* (2013.01); *G06F 1/32* (2013.01); *G06F 1/3278* (2013.01);
(Continued)

(58) Field of Classification Search
CPC ........ G06F 13/14; G06F 13/24; G06F 3/0659; G06F 3/061
(Continued)

(56) References Cited

U.S. PATENT DOCUMENTS 7,962,679 B2 * 6/2011 van de Ven ............. G06F 13/24
710/261
8,284,205 B2 * 10/2012 Miller .................. G06F 1/3203
345/502
(Continued)

OTHER PUBLICATIONS

Written Opinion for PCT/US2018/018510, dated Feb. 25, 2019, 5 pages.
(Continued)

*Primary Examiner* — Brian T Misiura
(74) *Attorney, Agent, or Firm* — Holland & Hart LLP/Qualcomm

(57) ABSTRACT

Optimizing network driver performance and power consumption in multi-core processor-based systems is disclosed. In this regard, a multi-core processor-based system provides multiple processor cores comprising one or more power-optimized processor cores and one or more performance-optimized processor cores, and a network device configured to assign network streams to a plurality of interrupts. A network driver calculates a current throughput level of the network device, and determines whether a throughput mode of the network driver should be modified to a high-throughput mode. If so, the network driver assigns each interrupt to one of the performance-optimized processor cores, and disables system reassignment of interrupts among the processor cores. Some aspects may also determine whether the throughput mode should be modified to a low-throughput mode, in which case the network driver assigns each interrupt to a same power-optimized processor core and enables system reassignment of interrupts among the processor cores.

32 Claims, 5 Drawing Sheets

(51) Int. Cl.
  *H04L 12/801* (2013.01)
  *G06F 9/50* (2006.01)
  *G06F 1/32* (2019.01)
  *G06F 1/3234* (2019.01)
(52) U.S. Cl.
  CPC .......... *G06F 9/4812* (2013.01); *G06F 9/5094* (2013.01); *H04L 47/10* (2013.01); *Y02D 10/14* (2018.01)
(58) Field of Classification Search
  USPC .................................................. 710/33, 261
  See application file for complete search history.

(56) References Cited

U.S. PATENT DOCUMENTS

| | | | | |
|---|---|---|---|---|
| 8,296,773 B2* | 10/2012 | Bose | ...................... | G06F 1/3203 718/105 |
| 8,463,971 B2* | 6/2013 | Solomita | ............... | G06F 9/4812 710/260 |
| 8,930,722 B2* | 1/2015 | Sprangle | ............... | G06F 1/3203 713/300 |
| 8,984,526 B2* | 3/2015 | Garg | ...................... | G06F 9/5083 718/1 |
| 9,274,832 B2* | 3/2016 | Chang | ................... | G06F 9/4881 |
| 9,424,092 B2* | 8/2016 | Singh | .................... | G06F 9/5027 |
| 9,471,395 B2* | 10/2016 | Ahmad | ................. | G06F 9/5088 |
| 9,696,771 B2* | 7/2017 | Park | ....................... | G06F 1/206 |
| 9,880,953 B2* | 1/2018 | Shajit | ..................... | G06F 13/24 |
| 9,996,398 B2* | 6/2018 | Lee | ........................ | G06F 9/4893 |
| 2009/0089470 A1* | 4/2009 | Ven | ........................ | G06F 1/3203 710/260 |
| 2009/0222654 A1 | 9/2009 | Hum et al. | | |
| 2011/0145461 A1* | 6/2011 | Zhao | ..................... | G06F 9/4812 710/267 |
| 2014/0181501 A1 | 6/2014 | Hicok et al. | | |
| 2016/0092274 A1* | 3/2016 | Singh | .................... | G06F 9/5027 718/104 |
| 2016/0266929 A1* | 9/2016 | Lu | .......................... | G06F 9/5027 |
| 2017/0318082 A1* | 11/2017 | Thakur | ................... | H04L 45/16 |
| 2017/0337000 A1* | 11/2017 | Dunn | ..................... | G06F 21/554 |
| 2018/0284869 A1* | 10/2018 | He | ........................ | H04L 67/1008 |

OTHER PUBLICATIONS

International Search Report and Written Opinion for PCT/US2018/018510, dated May 14, 2018, 12 pages.

* cited by examiner

OPTIMIZING NETWORK DRIVER PERFORMANCE AND POWER CONSUMPTION IN MULTI-CORE PROCESSOR-BASED SYSTEMS

PRIORITY APPLICATION

The present application claims priority under 35 U.S.C. § 119(e) to U.S. Provisional Patent Application Ser. No. 62/459,856, filed Feb. 16, 2017 and entitled "OPTIMIZING NETWORK DRIVER PERFORMANCE AND POWER CONSUMPTION IN MULTI-CORE PROCESSOR-BASED SYSTEMS," which is incorporated herein by reference in its entirety.

BACKGROUND

I. Field of the Disclosure

The technology of the disclosure relates generally to network drivers tasked with managing network traffic flow for network devices, and, in particular, to optimization of network driver performance and power consumption.

II. Background

Many contemporary processor-based systems are based on a "multi-core" architecture that provides multiple processor cores organized into processor clusters. Having multiple processor cores enables a processor-based system to execute multiple instructions concurrently, thus boosting the performance of parallel computing applications. However, maintaining a balance between providing acceptable performance and conserving power remains a challenge for multi-core processor-based systems. For mobile devices in particular, it is especially important for network devices and drivers to minimize power consumption per transceived byte of data while maximizing processor performance.

One conventional approach to providing a needed balance between performance and power consumption involves segregating processor cores into two clusters: one optimized for power consumption, and the other optimized for performance. In multi-core processor-based systems that support this approach, a kernel scheduler attempts to maintain executing threads on the power-optimized cluster, and distribute the executing threads to the performance-optimized cluster when required by the processor load. Interrupt handling may also be distributed in a similar fashion by interrupt-balancing processes (e.g., irq-balancer), which attempt to balance interrupts among processor cores based on interrupt service frequency.

However, these approaches often are insufficient for optimizing performance and power consumption for network drivers. Due to interrupt mitigation (a technique wherein network drivers process incoming network packets based on interrupts, which are considered non-schedulable entities), a kernel scheduler may provide no benefit. Moreover, interrupt-balancing processes like irq-balancer are also not sufficient in most cases for two reasons. First, the reaction time of irq-balancer is much too slow to react to bursty network traffic. Additionally, because most network drivers aggregate interrupt processing to minimize interrupt service routine (ISR) overhead, the number of interrupts is correspondingly reduced by design, which may result in irq-balancer failing to redistribute interrupts among processor cores.

SUMMARY OF THE DISCLOSURE

Aspects disclosed in the detailed description include optimizing network driver performance and power consumption in multi-core processor-based systems. In this regard, in some aspects, a multi-core processor-based system for optimizing network driver performance and power consumption provides a plurality of processor cores, including one or more power-optimized processor cores and one or more performance-optimized processor cores. The multi-core processor-based system also includes a network device that is configured to receive one or more network streams, and assign each network stream to an interrupt of a plurality of interrupts. The multi-core processor-based system also includes a network driver. The network driver is configured to calculate a current throughput level of the network device, and determine whether a throughput mode of the network driver should be modified (e.g., based on a comparison of the current throughput level and a throughput threshold, as a non-limiting example). If so, the network driver assigns each interrupt to which a network stream has been assigned to a performance-optimized processor core of the one or more performance-optimized processor cores, and disables system reassignment of the plurality of interrupts among the plurality of processor cores. In some aspects, if the network driver determines that the throughput mode of the network driver should be modified to a low-throughput mode, the network driver assigns each interrupt to which a network stream has been assigned to a same power-optimized processor core of the one or more power-optimized processor cores. After reassigning each interrupt to the power-optimized processor core, the network driver also enables system reassignment of the plurality of interrupts among the plurality of processor cores. In this manner, the multi-core processor-based system can optimize power consumption per bit transferred over the network device, while maintaining compatibility with existing mechanisms for interrupt management and balancing.

In another aspect, a multi-core processor-based system for optimizing network driver performance and power consumption is provided. The multi-core processor-based system comprises a plurality of processor cores comprising one or more power-optimized processor cores and one or more performance-optimized processor cores. The multi-core processor-based system also comprises a network device configured to receive one or more network streams, and assign each of the one or more network streams to an interrupt of a plurality of interrupts. The multi-core processor-based system further comprises a network driver configured to calculate a current throughput level of the network device. The network driver is further configured to determine, based on the current throughput level, whether a throughput mode of the network driver should be modified to a high-throughput mode. The network driver is also configured to, responsive to determining that a throughput mode of the network driver should be modified to a high-throughput mode, assign each interrupt of the plurality of interrupts to which a network stream is assigned to a performance-optimized processor core of the one or more performance-optimized processor cores. The network driver is additionally configured to, responsive to determining that a throughput mode of the network driver should be modified to a high-throughput mode, disable system reassignment of the plurality of interrupts among the plurality of processor cores.

In another aspect, a multi-core processor-based system for optimizing network driver performance and power consumption is provided. The multi-core processor-based system comprises a plurality of processor cores comprising one or more power-optimized processor cores and one or more performance-optimized processor cores. The multi-core processor-based system further comprises a means for calculating a current throughput level of a network device. The multi-core processor-based system also comprises a means for determining whether a throughput mode should be modified to a high-throughput mode. The multi-core processor-based system additionally comprises a means for assigning each interrupt of a plurality of interrupts to which a network stream is assigned to a performance-optimized processor core of the one or more performance-optimized processor cores, responsive to determining that a throughput mode should be modified to a high-throughput mode. The multi-core processor-based system further comprises a means for disabling system reassignment of the plurality of interrupts among the plurality of processor cores, responsive to determining that a throughput mode should be modified to a high-throughput mode.

In another aspect, a method for optimizing network driver performance and power consumption is provided. The method comprises calculating, by a network driver, a current throughput level of a network device of a multi-core processor-based system comprising a plurality of processor cores comprising one or more power-optimized processor cores and one or more performance-optimized processor cores. The method further comprises determining, by the network driver based on the current throughput level, whether a throughput mode of the network driver should be modified to a high-throughput mode. The method also comprises, responsive to determining that a throughput mode of the network driver should be modified to a high-throughput mode, assigning each interrupt of a plurality of interrupts to which a network stream is assigned to a performance-optimized processor core of the one or more performance-optimized processor cores. The method additionally comprises, responsive to determining that a throughput mode of the network driver should be modified to a high-throughput mode, disabling system reassignment of the plurality of interrupts among the plurality of processor cores.

In another aspect, a non-transitory computer-readable medium is provided. The non-transitory computer-readable medium stores thereon computer-executable instructions which, when executed, cause a processor to calculate a current throughput level of a network device of a multi-core processor-based system comprising a plurality of processor cores comprising one or more power-optimized processor cores and one or more performance-optimized processor cores. The computer-executable instructions further cause the processor to determine, based on the current throughput level, whether a throughput mode should be modified to a high-throughput mode. The computer-executable instructions also cause the processor to, responsive to determining that a throughput mode should be modified to a high-throughput mode, assign each interrupt of a plurality of interrupts to which a network stream is assigned to a performance-optimized processor core of the one or more performance-optimized processor cores. The computer-executable instructions additionally cause the processor to, responsive to determining that a throughput mode should be modified to a high-throughput mode, disable system reassignment of the plurality of interrupts among the plurality of processor cores.

DETAILED DESCRIPTION

Figure 1:
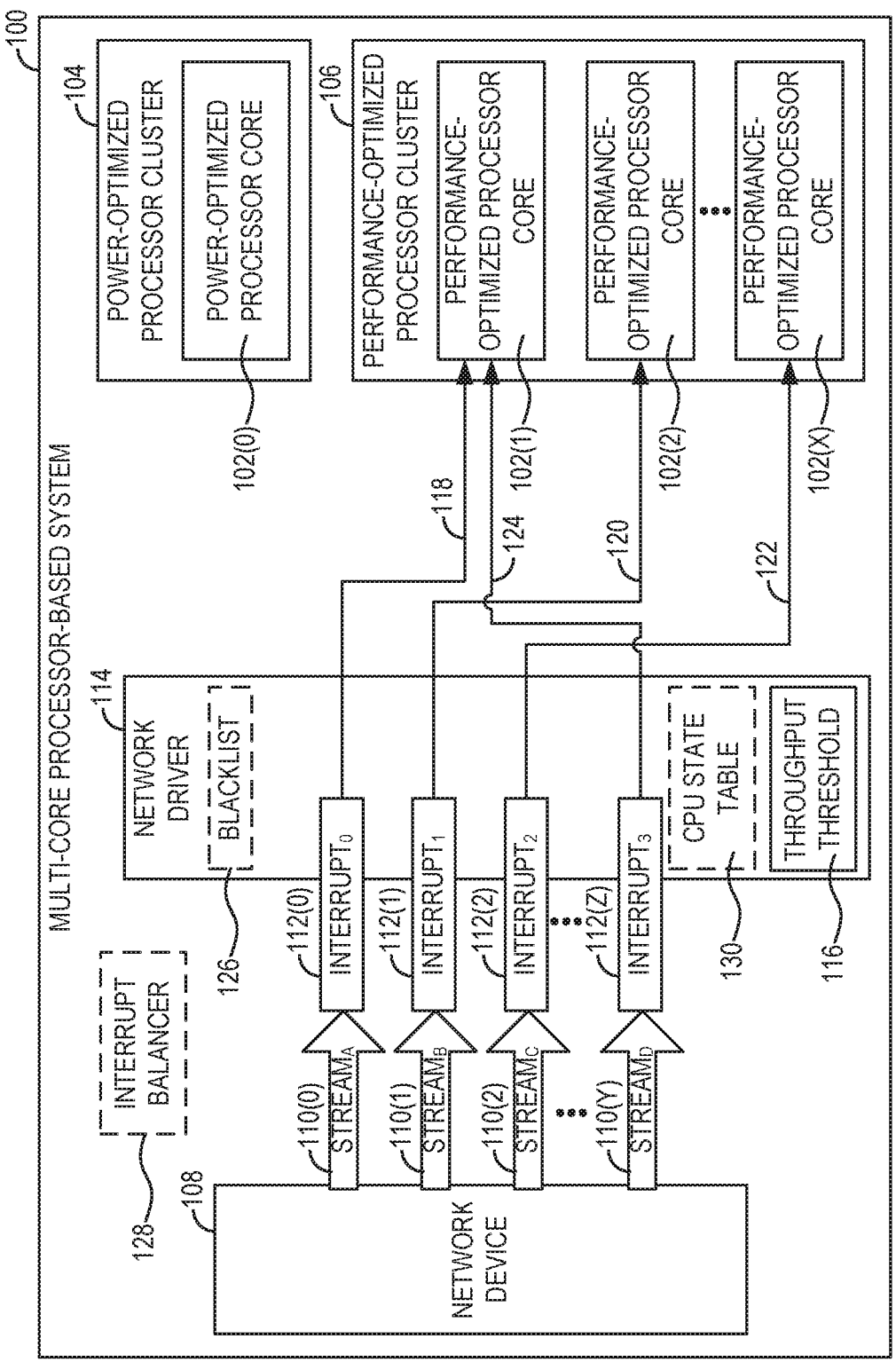
FIG. 1 is a block diagram of an exemplary multi-core processor-based system providing optimization of network driver performance and power consumption in a high-throughput mode.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include optimizing network driver performance and power consumption in multi-core processor-based systems. In this regard, FIG. 1 illustrates a multi-core processor-based system 100 that provides a plurality of processor cores 102(0)-102(X) for concurrent processing of executable instructions. In the example of FIG. 1, the processor cores 102(0)-102(X) are organized into a power-optimized processor cluster 104 (containing only the processor core 102(0)) and a performance-optimized processor cluster 106 (containing the processor cores 102(1)-102(X)). The processor core 102(0) of the power-optimized processor cluster 104 is configured or otherwise designated for use when power conservation is a high priority, while the processor cores 102(1)-102(X) of the performance-optimized processor cluster 106 are configured or otherwise designated for use to provide a higher level of system performance. It is to be understood that some aspects may include more or fewer processor cores and/or more or fewer processor clusters than illustrated in FIG. 1, and processor cores may be distributed among processor clusters in a manner other than that illustrated by FIG. 1.

The multi-core processor-based system 100 also provides a network device 108, which may be any element configured to transmit and receive data streams (e.g., network packets carried by packet-switched networks, as a non-limiting example) to and from other devices (not shown). As seen in FIG. 1, the network device 108 in this example receive streams 110(0)-110(Y), designated as "STREAM$_A$," "STREAM$_B$," "STREAM$_C$," and "STREAM$_D$," respectively. The network device 108 is further configured to assign the streams 110(0)-110(Y) to one of a number of interrupts 112(0)-112(Z), designated as "INTERRUPT$_0$," "INTERRUPT$_1$," "INTERRUPT$_2$," and "INTERRUPT$_3$," respectively. Each of the interrupts 112(0)-112(Z) represents a request for processing of the corresponding stream 110(0)-110(Y). In some aspects, the network device 108 assigns the streams 110(0)-110(Y) to the interrupts 112(0)-112(Z) based on a classification of the traffic received from each of the streams 110(0)-110(Y) by the network device 108. In the event that there are more streams 110(0)-110(Y) than interrupts 112(0)-112(Z), the streams 110(0)-110(Y) according to some aspects are assigned to the interrupts 112(0)-112(Z) using a round-robin scheme to ensure that consecutive ones of the streams 110(0)-110(Y) are assigned to different ones of the interrupts 112(0)-112(Z). It is to be understood that some aspects may provide more or fewer network devices, streams, and/or interrupts than illustrated in FIG. 1.

The multi-core processor-based system 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the multi-core processor-based system 100 may include elements in addition to those illustrated in FIG. 1.

As noted above, systems such as the multi-core processor-based system 100 of FIG. 1 may employ conventional solutions in an attempt to reduce per-packet processing overhead. For example, one solution includes optimizing interrupts 112(0)-112(Z) in such a way that one of the streams 110(0)-110(Y) would only incur a single interrupt service routine (ISR) overhead, with the remainder of each of the streams 110(0)-110(Y) being processed in polling mode. This solution also provides a uniform method for maintaining fairness among drivers by eliminating the risk of a network driver starving other drivers (as the network driver will keep processing network packets as long as there remain network packets to be processed). However, this conventional mechanism for balancing performance and power consumption may be insufficient for conserving power when network throughput is low enough to be handled by a single one of the processor cores 102(0)-102(X), while also efficiently distributing network traffic handling among multiple processor cores 102(0)-102(X) when network throughput increases. Likewise, conventional interrupt-balancing processes, such as irq-balancer, distribute interrupts among different processor cores, but generally are too slow to react to fast-changing network traffic patterns.

In this regard, the multi-core processor-based system 100 of FIG. 1 provides a network driver 114 that is configured to dynamically manage the distribution of network traffic from the streams 110(0)-110(Y). The network driver 114 maintains a configurable throughput threshold 116 that specifies a network traffic level (and/or a level of other performance metrics, in some aspects) against which a current throughput level of the network device 108 is periodically compared. If the throughput level of the network device 108 exceeds the throughput threshold 116, the network driver 114 modifies the current throughput mode to a "high-throughput" mode. The network driver 114 switches back to a "low-throughput" mode, in which interrupt management is handled by conventional mechanisms, when the throughput level of the network device 108 falls below the throughput threshold 116.

FIG. 1 shows an example of the network driver 114 modifying the current throughput mode to the high-throughput mode. As seen in FIG. 1, in the high-throughput mode, the network driver 114 takes control of interrupt management for the interrupts 112(0)-112(Z) that the network driver 114 is processing, and distributes the interrupts 112(0)-112(Z) among the performance-optimized processor cores 102(1)-102(X). For example, the interrupt 112(0) is assigned to the performance-optimized processor core 102(1) as indicated by arrow 118, while the interrupt 112(1) is assigned to the performance-optimized processor core 102(2) as indicated by arrow 120. Likewise, the network driver 114 assigns the interrupt 112(2) to the performance-optimized processor core 102(X) as indicated by arrow 122 and the interrupt 112(Z) to the performance-optimized processor core 102(1) as indicated by arrow 124. In this manner, the network driver 114 ensures that the streams 110(0)-110(Y) are processed in parallel by multiple performance-optimized processor cores 102(1)-102(X), thus boosting system performance.

While in the high-throughput mode, the network driver 114 also takes steps to disable the default system management of the interrupts 112(0)-112(Z) to prevent the multi-core processor-based system 100 from automatically reassigning the interrupts 112(0)-112(Z) to different ones of the processor cores 102(0)-102(X). In some aspects, the network driver 114 is configured to provide a blacklist 126 of interrupts that are to be excluded from system reassignment of the interrupts 112(0)-112(Z) among the processor cores 102(0)-102(X). In such aspects, the network driver 114 may provide the blacklist 126 to an interrupt balancer 128 (such as the irq-balancer process). The interrupt balancer 128, which in normal operation operates on all of the interrupts 112(0)-112(Z), may be configured in such aspects to refrain from performing system reassignment of the interrupts 112(0)-112(Z) specified by the blacklist 126. It is to be understood that other mechanisms for disabling system reassignment of the interrupts 112(0)-112(Z) while in high-throughput mode may be implemented by those of skill in the art.

Some aspects may also provide that, when switching to the high-throughput mode, the network driver 114 may increase the minimum clock frequency of the performance-optimized processor cores 102(1)-102(X) to which the interrupts 112(0)-112(Z) have been distributed. In such aspects, the conventional minimum clock frequency of the performance-optimized processor cores 102(1)-102(X) may cause occasional fluctuations in network throughput. By increasing the minimum clock frequency, the network throughput fluctuations may be eliminated, resulting in improved system performance. As a non-limiting example, the performance-optimized processor cores 102(1)-102(X) may be configured to operate at a frequency range of 300 MHz to 2100 MHz, adjustable in 100 MHz increments. When changing to the high-throughput mode, the network driver 114 may increase the minimum clock frequency of the performance-optimized processor cores 102(1)-102(X) to 700 MHz to reduce or eliminate the occurrence of network throughput fluctuations.

In some aspects, decisions by the network driver 114 regarding the assignment of the interrupts 112(0)-112(Z) to the processor cores 102(0)-102(X) may be based on a central processing unit (CPU) state table 130. The CPU state table 130 may be used by the network driver 114 to track the availability and current work load for each of the processor cores 102(0)-102(X), and may be updated every time a mode switch occurs and/or one of the interrupts 112(0)-112(Z) is reassigned among the processor cores 102(0)-102(X). When assigning one of the interrupts 112(0)-112(Z), the network driver 114 may select one of the processor cores 102(0)-102(X) having the fewest number of assigned interrupts 112(0)-112(X) as a target for the next assignment. After assigning the interrupt 112(0)-112(Z), the network driver 114 may update the CPU state table 130 accordingly. Similarly, if one of the processor cores 102(0)-102(X) is taken offline (e.g., because a thermal limit is exceeded), the network driver 114 may receive a notification (not shown) from the multi-core processor-based system 100, and may update the CPU state table 130 and reassign any affected interrupts 112(0)-112(Z) from the processor core 102(0)-102(X) that was taken offline to other processor cores among the processor cores 102(0)-102(X) accordingly.

Figure 2:
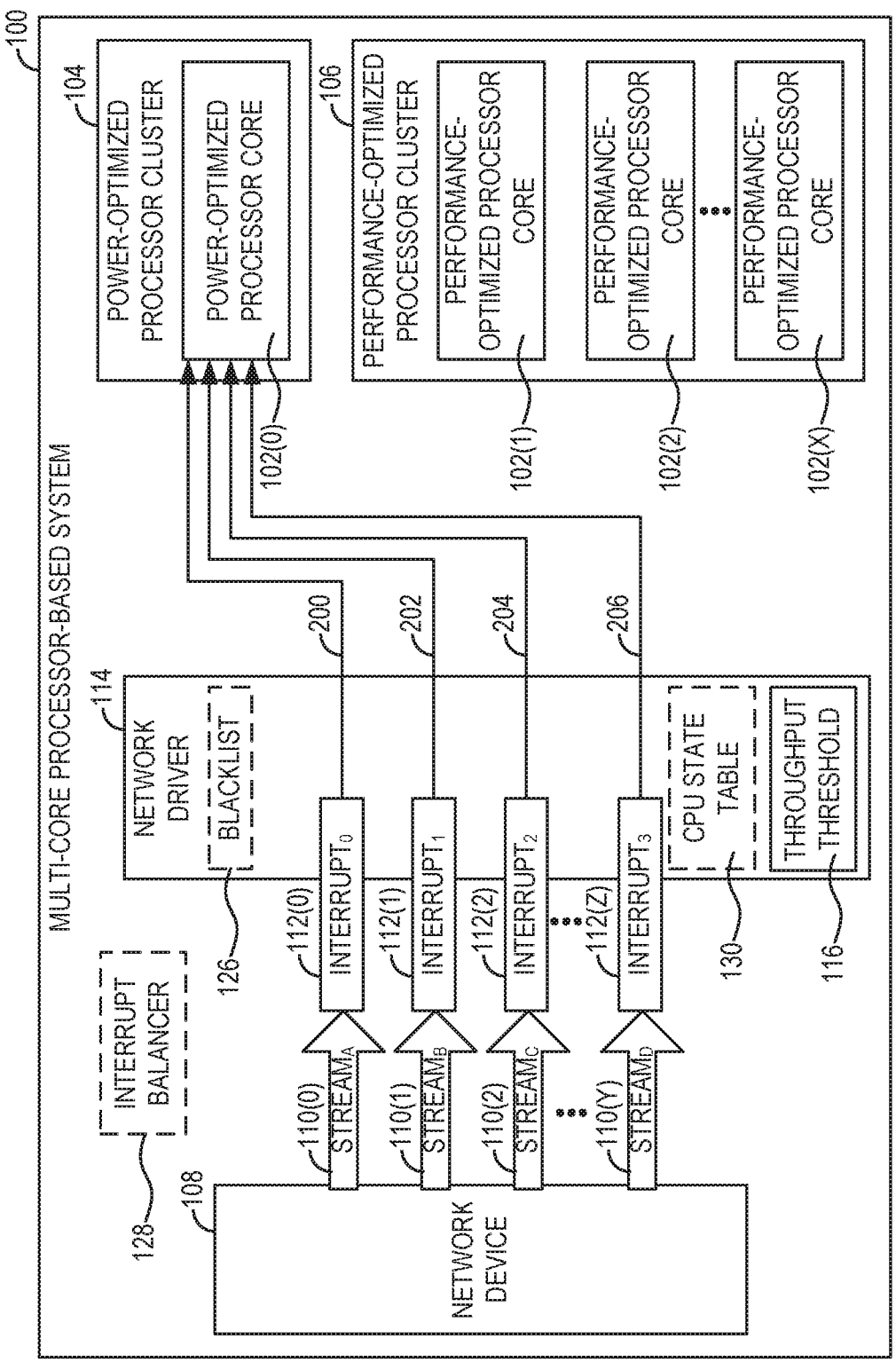
FIG. 2 is a block diagram of the multi-core processor-based system of FIG. 1 providing optimization of network driver performance and power consumption in a low-throughput mode.

FIG. 2 illustrates the multi-core processor-based system 100 of FIG. 1 after the network driver 114 has switched back to a low-throughput mode. As seen in FIG. 2, all of the interrupts 112(0)-112(Z) are assigned by the network driver 114 to the power-optimized processor core 102(0), as indicated by arrows 200, 202, 204, and 206. In the low-throughput mode, the network driver 114 also enables the system reassignment of the interrupts 112(0)-112(Z), allowing the multi-core processor-based system 100 to manage distribution of the interrupts 112(0)-112(Z) according to conventional mechanisms. For example, in some aspects, a kernel executing on the multi-core processor-based system 100 may provide a mechanism known as Receive Packet Steering (RPS), which allows network packets to be directed to specific processor cores 102(0)-102(X) for processing. In such aspects, if only a single stream 110(0)-110(Y) is received by the network device 108 or dominates network traffic at a given time, the network driver 114 may enable RPS to ensure that processing by the network driver 114 and a networking stack (not shown) is able to be performed concurrently.

Figure 3A:
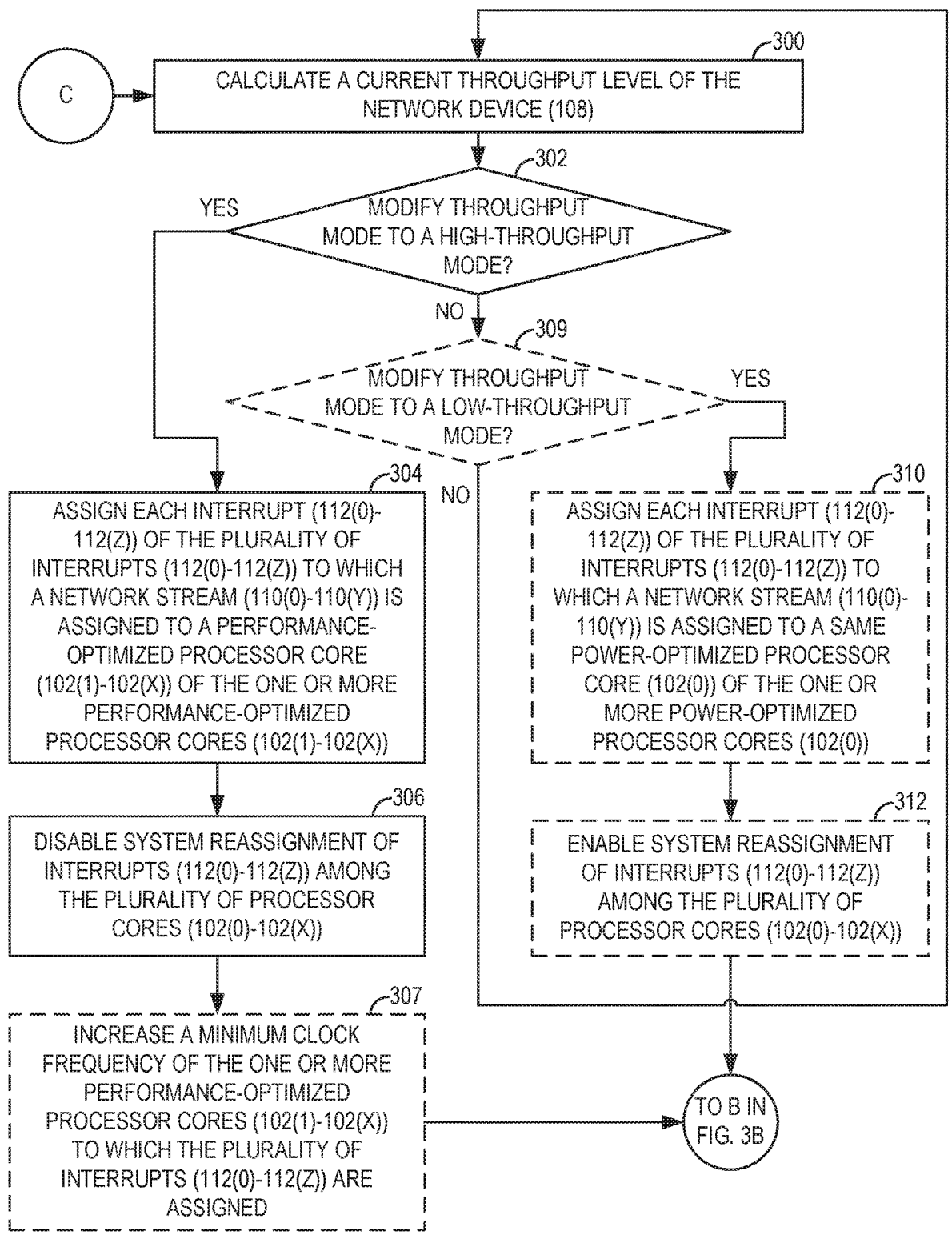
FIGS. 3A-3B are flowcharts illustrating exemplary operations for optimizing network driver performance and power consumption according to some aspects.
Figure 3B:
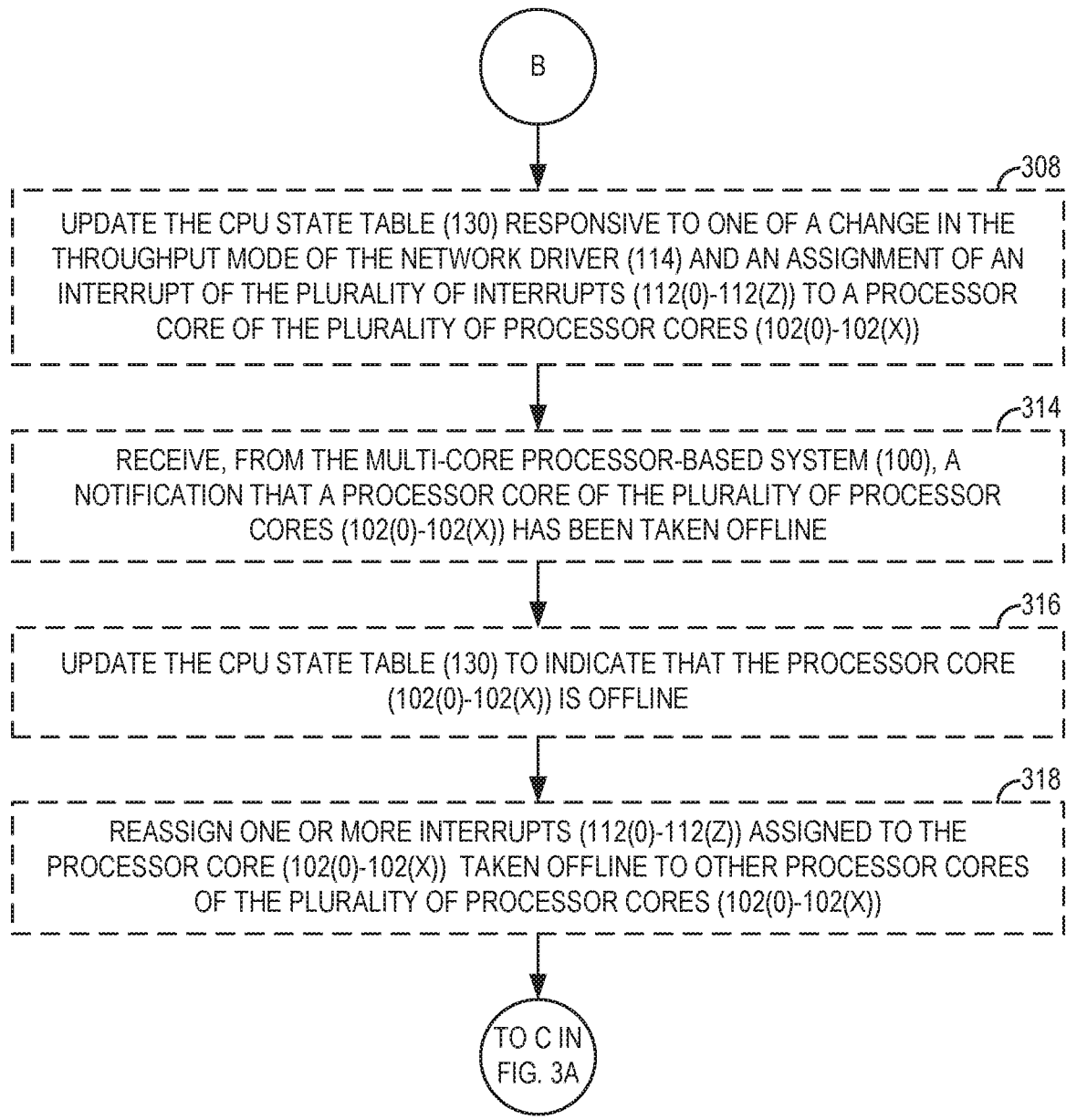

To illustrate exemplary operations of the network driver 114 of FIGS. 1 and 2 for optimizing performance and power consumption, FIGS. 3A and 3B are provided. For the sake of clarity, elements of FIGS. 1 and 2 are referenced in describing FIGS. 3A and 3B. In FIG. 3A, operations begin with the network driver 114 calculating a current throughput level of the network device 108 (block 300). Accordingly, the network driver 114 may be referred to herein as "a means for calculating a current throughput level of a network device." The network driver 114 then determines whether to modify the current throughput mode to a high-throughput mode (block 302). In this regard, the network driver 114 may be referred to herein as "a means for determining whether a throughput mode should be modified to a high-throughput mode." In some aspects, operations of decision block 302 for determining whether to modify the current throughput mode of the network device 108 to the high-throughput mode may include determining whether the network device 108 is presently in a low-throughput mode and the current throughput level of the network device 108 exceeds the throughput threshold 116 of the network device 108.

If the network driver 114 determines at decision block 302 that the current throughput mode should be modified from a low-throughput mode to a high-throughput mode, the network driver 114 next assigns each interrupt 112(0)-112(Z) of the plurality of interrupts 112(0)-112(Z) to which a network stream 110(0)-110(Y) is assigned to a performance-optimized processor core 102(1)-102(X) of the one or more performance-optimized processor cores 102(1)-102(X) (block 304). The network driver 114 thus may be referred to herein as "a means for assigning each interrupt of a plurality of interrupts to which a network stream is assigned to a performance-optimized processor core of the one or more performance-optimized processor cores, responsive to determining that a throughput mode should be modified to a high-throughput mode." Operations of block 304 for assigning the plurality of interrupts 112(0)-112(Z) to the one or more performance-optimized processor cores 102(1)-102(X) in some aspects may include selecting a performance-optimized processor core 102(1)-102(X) having a fewest number of assigned interrupts 112(0)-112(Z) as indicated by the CPU state table 130.

The network driver 114 also disables system reassignment of the interrupts 112(0)-112(Z) among the plurality of processor cores 102(0)-102(X) (block 306). Accordingly, the network driver 114 may be referred to herein as "a means for disabling system reassignment of the plurality of interrupts among the plurality of processor cores, responsive to determining that a throughput mode should be modified to a high-throughput mode." In some aspects, operations of block 306 for disabling system reassignment of the interrupts 112(0)-112(Z) may include providing the blacklist 126 of one or more interrupts of the plurality of interrupts 112(0)-112(Z) to be excluded from system reassignment to the interrupt balancer 128 (e.g., the irq-balancer, as a non-limiting example). Some aspects may also provide that the network driver 114 may increase a minimum clock frequency of the one or more performance-optimized processor cores (102(1)-102(X)) to which the plurality of interrupts (112(0)-112(Z)) are assigned (block 307). Processing then resumes at block 308 of FIG. 3B.

In some aspects, if the network driver 114 determines at decision block 302 that the current throughput mode should not be modified to the high-throughput mode, the network driver 114 next may determine whether the throughput mode should be modified to a low-throughput mode (block 309). Some aspects may provide that operations of decision block 309 for determining whether to modify the current throughput mode of the network device 108 to the low-throughput mode may include determining whether the network device 108 is presently in the high-throughput mode and the current throughput level of the network device 108 is below the throughput threshold 116 of the network device. If the network driver 114 determines at decision block 309 that no change to the current throughput mode is necessary, processing resumes at block 300. However, if the network driver 114 determines at decision block 309 that the current throughput mode should be changed to a low-throughput mode, the network driver 114 assigns each interrupt 112(0)-112(Z) of the plurality of interrupts 112(0)-112(Z) to which a network stream 110(0)-110(Y) is assigned to a same power-optimized processor core 102(0) of the one or more power-optimized processor cores 102(0) (block 310). Operations of block 310 for assigning the plurality of interrupts 112(0)-112(Z) to the one or more power-optimized processor cores 102(0) in some aspects may include identifying an available power-optimized processor core 102(0) based on the contents of the CPU state table 130. The network driver 114 next enables system reassignment of the interrupts 112(0)-112(Z) among the plurality of processor cores 102(0)-102(X) (block 312). Processing then resumes at block 308 of FIG. 3B.

Referring now to FIG. 3B, in some aspects, the network driver 114 updates the CPU state table 130 responsive to one of a change in the throughput mode of the network driver 114 and an assignment of an interrupt of the plurality of interrupts 112(0)-112(Z) to a processor core of the plurality of processor cores 102(0)-102(X) (block 308). Some aspects may also provide that the network driver 114 may receive, from the multi-core processor-based system 100, a notification that a processor core of the plurality of processor cores 102(0)-102(X) has been taken offline (block 314). In response, the network driver 114 may update the CPU state table 130 to indicate that the processor core 102(0)-102(X) is offline (block 316). The network driver 114 also reassigns one or more interrupts 112(0)-112(Z) assigned to the processor core 102(0)-102(X) taken offline to other processor cores of the plurality of processor cores 102(0)-102(X) (block 318). Processing then returns to block 300 of FIG. 3A.

Optimizing network driver performance and power consumption in multi-core processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 4:
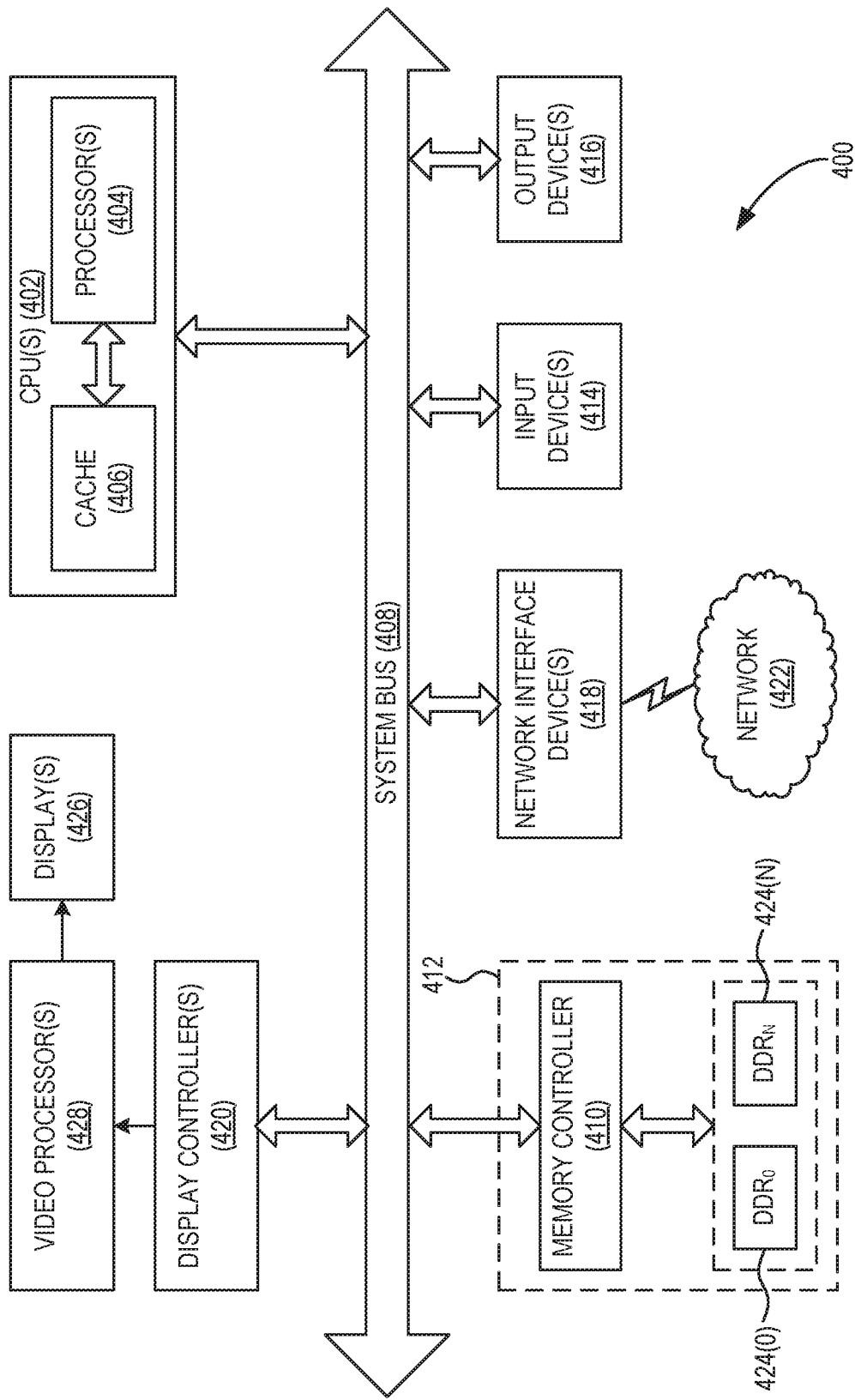
FIG. 4 is a block diagram of an exemplary processor-based system that can include the network driver of FIGS. 1 and 2.

In this regard, FIG. 4 illustrates an example of a processor-based system 400 that can employ the network driver 114 illustrated in FIGS. 1 and 2. The processor-based system 400, which corresponds to the multi-core processor-based system 100 of FIGS. 1 and 2, includes one or more CPUs 402, each including one or more processors 404. The CPU(s) 402 may have cache memory 406 coupled to the processor(s) 404 for rapid access to temporarily stored data, and in some aspects may correspond to the processor cores 102(0)-102(X) of FIGS. 1 and 2. The CPU(s) 402 is coupled to a system bus 408 and can intercouple master and slave devices included in the processor-based system 400. As is well known, the CPU(s) 402 communicates with these other devices by exchanging address, control, and data information over the system bus 408. For example, the CPU(s) 402 can communicate bus transaction requests to a memory controller 410 as an example of a slave device.

Other master and slave devices can be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including but not limited to input keys, switches, voice processors, etc. The output device(s) 416 can include any type of output device, including, but not limited to, audio, video, other visual indicators, etc. The network interface device(s) 418 can be any devices configured to allow exchange of data to and from a network 422. The network 422 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include one or more memory units 424(0)-424(N).

The CPU(s) 402 may also be configured to access the display controller(s) 420 over the system bus 408 to control information sent to one or more displays 426. The display controller(s) 420 sends information to the display(s) 426 to be displayed via one or more video processors 428, which process the information to be displayed into a format suitable for the display(s) 426. The display(s) 426 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A multi-core processor-based system for optimizing network driver performance and power consumption, comprising:
    a plurality of processor cores comprising one or more power-optimized processor cores and one or more performance-optimized processor cores;
    a network device configured to:
        receive one or more network streams; and
        assign each of the one or more network streams to an interrupt of a plurality of interrupts; and
    a network driver configured to:
        calculate a current throughput level of the network device;
        determine, based on the current throughput level, whether a throughput mode of the network driver should be modified to a high-throughput mode; and
        responsive to determining that the throughput mode of the network driver should be modified to the high-throughput mode:
            assign each interrupt of the plurality of interrupts to which a network stream is assigned to a performance-optimized processor core of the one or more performance-optimized processor cores; and
            disable system reassignment of the plurality of interrupts among the plurality of processor cores, wherein the network driver is configured to disable the system reassignment of the plurality of interrupts among the plurality of processor cores by being configured to disable an interrupt balancer.

2. The multi-core processor-based system of claim 1, wherein the network driver is configured to determine, based on the current throughput level, whether the throughput mode of the network driver should be modified to the high-throughput mode by being configured to determine whether the network driver is presently in a low-throughput mode and whether the current throughput level of the network device exceeds a throughput threshold of the network device.

3. The multi-core processor-based system of claim 1, wherein the network driver is configured to disable the system reassignment of the plurality of interrupts among the plurality of processor cores by being further configured to provide a blacklist of one or more interrupts of the plurality of interrupts to be excluded from the system reassignment to the interrupt balancer.

4. The multi-core processor-based system of claim 1, wherein the network driver is further configured to, responsive to determining that the throughput mode of the network driver should be modified to the high-throughput mode, increase a minimum clock frequency of the one or more performance-optimized processor cores to which the plurality of interrupts are assigned.

5. The multi-core processor-based system of claim 1, wherein the network driver is further configured to update a central processing unit (CPU) state table to track a count of interrupts assigned to each processor core of the plurality of processor cores, responsive to one of a change in the throughput mode of the network driver and an assignment of an interrupt of the plurality of interrupts to a processor core of the plurality of processor cores.

6. The multi-core processor-based system of claim 5, wherein the network driver is configured to assign each interrupt of the plurality of interrupts to the performance-optimized processor core of the one or more performance-optimized processor cores by being configured to select a performance-optimized processor core having a fewest number of assigned interrupts among the plurality of processor cores as indicated by the CPU state table.

7. The multi-core processor-based system of claim 5, wherein the network driver is further configured to:
    receive, from the multi-core processor-based system, a notification that a processor core of the plurality of processor cores has been taken offline; and
    responsive to receiving the notification:
        update the CPU state table to indicate that the processor core, associated with the notification, is offline; and
        reassign one or more interrupts assigned to the processor core taken offline to other processor cores of the plurality of processor cores.

8. The multi-core processor-based system of claim 1, wherein the network driver is further configured to:
    determine, based on the current throughput level, whether the throughput mode of the network driver should be modified to a low-throughput mode; and
    responsive to determining that the throughput mode of the network driver should be modified to the low-throughput mode:
        assign each interrupt of the plurality of interrupts to a same power-optimized processor core of the one or more power-optimized processor cores; and
        enable the system reassignment of the plurality of interrupts among the plurality of processor cores.

9. The multi-core processor-based system of claim 8, wherein the network driver is configured to determine, based on the current throughput level, whether the throughput mode of the network driver should be modified to the low-throughput mode by being configured to determine whether the network driver is presently in the high-throughput mode and whether the current throughput level of the network device is below a throughput threshold of the network device.

10. The multi-core processor-based system of claim 8, further comprising the interrupt balancer, wherein the network driver is configured to, responsive to determining that the throughput mode of the network driver should be modified to the low-throughput mode, enable the system reassignment of the plurality of interrupts among the plurality of processor cores by being configured to enable the interrupt balancer to manage distribution of the plurality of interrupts among the plurality of processor cores.

11. The multi-core processor-based system of claim 1, wherein the multi-core processor-based system is integrated into an integrated circuit (IC).

12. The multi-core processor-based system of claim 1, wherein the multi-core processor-based system is integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. The multi-core processor-based system of claim 1, further comprising the interrupt balancer, wherein the network driver is configured to, responsive to determining that the throughput mode of the network driver should be modified to the high-throughput mode, disable the system reassignment of the plurality of interrupts among the plurality of processor cores by being configured to disable the interrupt balancer from managing distribution of the plurality of interrupts among the plurality of processor cores.

14. A multi-core processor-based system for optimizing network driver performance and power consumption, comprising:
    a plurality of processor cores comprising one or more power-optimized processor cores and one or more performance-optimized processor cores;
    a means for calculating a current throughput level of a network device;
    a means for determining whether a throughput mode of a network driver should be modified to a high-throughput mode;
    a means for assigning each interrupt of a plurality of interrupts to which a network stream is assigned to a performance-optimized processor core of the one or more performance-optimized processor cores, responsive to determining that the throughput mode of the network driver should be modified to the high-throughput mode; and
    a means for disabling system reassignment of the plurality of interrupts among the plurality of processor cores, responsive to determining that the throughput mode of the network driver should be modified to the high-throughput mode, wherein the means for disabling system reassignment disables the system reassignment of the plurality of interrupts among the plurality of processor cores by disabling an interrupt balancer.

15. A method for optimizing network driver performance and power consumption, comprising:
    calculating, by a network driver, a current throughput level of a network device of a multi-core processor-based system comprising a plurality of processor cores comprising one or more power-optimized processor cores and one or more performance-optimized processor cores;
    determining, by the network driver based on the current throughput level, whether a throughput mode of the network driver should be modified to a high-throughput mode; and
    responsive to determining that the throughput mode of the network driver should be modified to the high-throughput mode:
        assigning, by the network driver, each interrupt of a plurality of interrupts to which a network stream is assigned to a performance-optimized processor core of the one or more performance-optimized processor cores; and
        disabling, by the network driver, system reassignment of the plurality of interrupts among the plurality of processor cores, wherein disabling the system reassignment of the plurality of interrupts among the plurality of processor cores comprises disabling an interrupt balancer.

16. The method of claim 15, wherein determining, based on the current throughput level, whether the throughput mode of the network driver should be modified to the high-throughput mode comprises determining whether the network driver is presently in a low-throughput mode and whether the current throughput level of the network device exceeds a throughput threshold of the network device.

17. The method of claim 15, wherein disabling the system reassignment of the plurality of interrupts among the plurality of processor cores further comprises providing a blacklist of one or more interrupts of the plurality of interrupts to be excluded from the system reassignment to the interrupt balancer.

18. The method of claim 15, further comprising, responsive to determining that the throughput mode of the network driver should be modified to the high-throughput mode, increasing a minimum clock frequency of the one or more performance-optimized processor cores to which the plurality of interrupts are assigned.

19. The method of claim 15, further comprising updating a central processing unit (CPU) state table to track a count of interrupts assigned to each processor core of the plurality of processor cores, responsive to one of a change in the throughput mode of the network driver and an assignment of an interrupt of the plurality of interrupts to a processor core of the plurality of processor cores.

20. The method of claim 19, wherein assigning each interrupt of the plurality of interrupts to the performance-optimized processor core of the one or more performance-optimized processor cores comprises selecting a performance-optimized processor core having a fewest number of assigned interrupts among the plurality of processor cores as indicated by the CPU state table.

21. The method of claim 19, further comprising:
    receiving, from the multi-core processor-based system, a notification that a processor core of the plurality of processor cores has been taken offline; and
    responsive to receiving the notification:
        updating the CPU state table to indicate that the processor core, associated with the notification, is offline; and
        reassigning one or more interrupts assigned to the processor core taken offline to other processor cores of the plurality of processor cores.

22. The method of claim 15, further comprising:
    determining, based on the current throughput level, whether the throughput mode of the network driver should be modified to a low-throughput mode; and
    responsive to determining that the throughput mode of the network driver should be modified to the low-throughput mode:
        assigning each interrupt of the plurality of interrupts to a same power-optimized processor core of the one or more power-optimized processor cores; and
        enabling the system reassignment of the plurality of interrupts among the plurality of processor cores.

23. The method of claim 22, wherein determining, based on the current throughput level, whether the throughput mode of the network driver should be modified to the low-throughput mode comprises determining whether the network driver is presently in the high-throughput mode and whether the current throughput level of the network device is below a throughput threshold of the network device.

24. A non-transitory computer-readable medium having stored thereon computer-executable instructions which, when executed, cause a processor to:
 calculate a current throughput level of a network device of a multi-core processor-based system comprising a plurality of processor cores comprising one or more power-optimized processor cores and one or more performance-optimized processor cores;
 determine, based on the current throughput level, whether a throughput mode of a network driver should be modified to a high-throughput mode; and
 responsive to determining that the throughput mode of the network driver should be modified to the high-throughput mode:
  assign each interrupt of a plurality of interrupts to which a network stream is assigned to a performance-optimized processor core of the one or more performance-optimized processor cores; and
  disable system reassignment of the plurality of interrupts among the plurality of processor cores, wherein the non-transitory computer-readable medium has stored thereon computer-executable instructions to cause the processor to disable the system reassignment of the plurality of interrupts among the plurality of processor cores by causing the processor to disable an interrupt balancer.

25. The non-transitory computer-readable medium of claim 24 having stored thereon computer-executable instructions to cause the processor to determine, based on the current throughput level, whether the throughput mode of the network driver should be modified to the high-throughput mode by causing the processor to determine whether the network driver is presently in a low-throughput mode and whether the current throughput level of the network device exceeds a throughput threshold of the network device.

26. The non-transitory computer-readable medium of claim 24 having stored thereon computer-executable instructions to cause the processor to disable the system reassignment of the plurality of interrupts among the plurality of processor cores by further causing the processor to provide a blacklist of one or more interrupts of the plurality of interrupts to be excluded from the system reassignment to the interrupt balancer.

27. The non-transitory computer-readable medium of claim 24 having stored thereon computer-executable instructions to cause the processor to, responsive to determining that the throughput mode of the network driver should be modified to the high-throughput mode, increase a minimum clock frequency of the one or more performance-optimized processor cores to which the plurality of interrupts are assigned.

28. The non-transitory computer-readable medium of claim 24 having stored thereon computer-executable instructions to cause the processor to update a central processing unit (CPU) state table to track a count of interrupts assigned to each processor core of the plurality of processor cores, responsive to one of a change in the throughput mode of the network driver and an assignment of an interrupt of the plurality of interrupts to a processor core of the plurality of processor cores.

29. The non-transitory computer-readable medium of claim 28 having stored thereon computer-executable instructions to cause the processor to assign each interrupt of the plurality of interrupts to the performance-optimized processor core of the one or more performance-optimized processor cores by causing the processor to select a performance-optimized processor core having a fewest number of assigned interrupts among the plurality of processor cores as indicated by the CPU state table.

30. The non-transitory computer-readable medium of claim 28 having stored thereon computer-executable instructions to cause the processor to:
 receive a notification that a processor core of the plurality of processor cores has been taken offline; and
 responsive to receiving the notification:
  update the CPU state table to indicate that the processor core, associated with the notification, is offline; and
  reassign one or more interrupts assigned to the processor core taken offline to other processor cores of the plurality of processor cores.

31. The non-transitory computer-readable medium of claim 24 having stored thereon computer-executable instructions to cause the processor to:
 determine, based on the current throughput level, whether the throughput mode of the network driver should be modified to a low-throughput mode; and
 responsive to determining that the throughput mode of the network driver should be modified to the low-throughput mode:
  assign each interrupt of the plurality of interrupts to a same power-optimized processor core of the one or more power-optimized processor cores; and
  enable the system reassignment of the plurality of interrupts among the plurality of processor cores.

32. The non-transitory computer-readable medium of claim 31 having stored thereon computer-executable instructions to cause the processor to determine, based on the current throughput level, whether the throughput mode of the network driver should be modified to the low-throughput mode by causing the processor to determine whether the network driver is presently in the high-throughput mode and whether the current throughput level of the network device is below a throughput threshold of the network device.

* * * * *